United States Patent Office 3,689,462
Patented Sept. 5, 1972

3,689,462
PROCESS FOR PREPARING POLYCARBONATES
Michael J. Maximovich, Akron, Ohio, assignor to
PPG Industries, Inc., Pittsburgh, Pa.
No Drawing. Filed May 19, 1971, Ser. No. 144,994
Int. Cl. C08g 17/13
U.S. Cl. 260—77.5 D      10 Claims

ABSTRACT OF THE DISCLOSURE

Polycarbonates prepared from an alkylene or dialkyl carbonate (or 1,2-epoxide with carbon dioxide) and monomeric polyols are prepared in good yield at atmospheric pressure and/or with high carbon dioxide concentrations in short reaction times by employing a stannate catalyst of the formula:

$$M_xSnO_3$$

wherein M is an alkali metal, alkaline earth metal or ammonium, preferably potassium or sodium; and $x$ is an integer of 1 or 2 sufficient to satisfy the valence requirements.

---

This invention relates to a novel process for preparing polycarbonates with or without ester linkages from carbon dioxide and 1,2-epoxides or from alkylene or dialkyl carbonates and a monomeric polyol in the presence of a minor but effective amount of a stannate catalyst.

One method for preparing polycarbonate esters is illustrated by Malkemus, U.S. Pat. No. 3,133,113. There it is disclosed that an alkylene carbonate such as ethylene carbonate can be reacted with a glycol such as diethylene glycol in a mole ratio in the range of 1.2:1 to 2.5:1 at reduced pressure while removing ethylene glycol formed by the reaction until the reaction is complete. The catalyst employed is a mixed zinc borate-alkaline earth metal oxide catalyst.

Stevens, U.S. Pats. Nos. 3,248,414, 3,248,415, and 3,248,416 teaches the preparation of polycarbonates from: (1) carbon dioxide and 1,2-epoxides; (2) cyclic carbonates such as ethylene carbonate or (3) from cyclic carbonates and a 1,2-epoxide. A minor amount of a polyol is employed as an initiator. The reaction is usually conducted under pressure in the presence of a metal carbonate, metal hydroxide, tri-sodium phosphate or a tertiary amine.

It has now been discovered that polycarbonates can be produced by the aforesaid methods in good yield and/or with a higher carbonate content when the reaction is conducted in the presence of a stannate catalyst of the formula:

$$M_xSnO_3$$

wherein M is an alkali metal, alkaline earth metal or ammonium and $x$ is an integer of 1 or 2 sufficient to satisfy the valence requirements.

Exemplary of suitable metals as represented by M are: lithium, sodium, potassium, magnesium, calcium, and barium. The alkali metals and particularly sodium and potassium are preferred.

Exemplary of suitable catalysts are:

sodium-stannate trihydrate,
potassium stannate trihydrate,
potassium stannate monohydrate,
barium stannate trihydrate,
magnesium stannate trihydrate, and the like.

The amount of catalyst will depend upon the reactants and particular catalyst employed but only a minor amount will be required. The preferred sodium and potassium stannates can be employed in the lesser amounts. Generally, from between about 0.01 to about 5 percent by weight of the cyclic carbonate and 1,2-epoxide will be sufficient.

The reactants employed to produce the polycarbonates are described in the aforementioned patents. Alkylene carbonates which can be employed include ethylene carbonate, propylene carbonate, diethyl carbonate, dimethyl carbonate, and other lower alkylene carbonates. Alkylene carbonates can be represented by the formula:

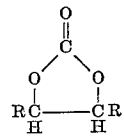

in which each R represents hydrogen or an alkyl group having from 1 to 3 carbon atoms, inclusive. Although less preferred, dialkyl carbonates can be employed and are represented by the formula:

wherein each R represents an alkyl radical having from 1 to 3 carbon atoms, inclusive. Aromatic carbonates such as diphenyl carbonate can also be employed.

The epoxides which can be reacted with carbon dioxide are those previously employed and include: ethylene oxide, propylene oxide, or like olefinically saturated and unsaturated aliphatic 1,2-epoxides of up to and including 5 carbon atoms. Such compounds are often referred to as oxiranes. Other epoxides include cyclohexene epoxide, 4-vinylcyclohexene, 4-vinylcyclohexene dioxide, and butadiene diepoxide. Mixtures can also be employed but ethylene oxide is the preferred oxide.

The monomeric polyols include diols of the structure HO—R—OH wherein R is an alkylene radical of at least 2 carbons up to 25 or more, or an ether such as ethylene glycol, diethylene glycol, triethylene glycol, propylene glycol and dipropylene glycol, or even water can be employed. The polyols preferably have from between 2 and about 10 carbon atoms; and preferably not more than about 4 hydroxyl groups. The compounds with more hydroxyl groups such as sugars tend to result in discoloration and best results have generally been found with diols having no ether linkages such as ethylene glycol and propylene glycol and more preferably the former. Exemplary of suitable triols are glycerol, trimethylolethane and trimethylolpropane. A suitable tetrol is pentaerythritol. Also cycloaliphatic diols such as 1,3-dihydroxy cyclopentane and aromatic dihydroxy compounds such as catechol, bisphenols, and xylene glycols are useful. Beside polyols, however, other organic compounds having at least 2 active hydrogens, usually from 2 to 4, can be employed. By active hydrogen is meant, a hydrogen linked directly to a nitrogen, sulfur or oxygen atom such as is found in hydroxy, non-tertiary amino, mercapto, and carboxyl groups. These include polyamines, mercaptans, alkylolamines, and the like, such as are illustrated in column 6 of U.S. Pat. No. 3,248,415.

Conventional reaction ratios and conditions can be employed such as, for example, 1 to 6 moles of alkylene oxide per mole of carbon dioxide, and a polyol in an amount sufficient to give between 0.01 to 0.2 mole per mole of ethylene oxide when a polycarbonate low in ester linkages is desired having a molecular weight between about 700 and about 5,000. When ester linkages are desired, an alkylene carbonate such as ethylene carbonate can be reacted with a polyol such as ethylene glycol in a carbonate ester to glycol mole ratio in the range of 1.2:1 to 2.5:1 with removal of ethylene glycol.

The temperature of the reaction will vary from between about 160 and about 300° C. One of the benefits of the invention is that with the preferred alkali metal catalysts, the reaction or polymerization can generally be conducted at atmospheric pressure.

These hydroxyterminated polycarbonates have the conventional uses. The polycarbonates with a higher carbon dioxide content (by use of the preferred catalysts herein and the preferred ethylene glycol which permits lower reaction temperatures and times) are particularly suitable for reaction with diisocyanates to form rubbery urethanes of high quality or foaming agents can be employed to form products useful as crash pads or upholstery pillows. These products high in $CO_2$ content from about 20 to 30 percent are quite viscous and, in general, the viscosity rises by a factor of 10 when the $CO_2$ content is doubled from 12.5 to 25 percent. When the molecular weight is doubled from 800 to 1600 however, the viscosity rises only by a factor of 2–3. These products can be employed as a partial or complete replacement for adipate esters and polytetramethylene ethers in elastomeric urethane formulations. The highly viscous products can be recovered by treating said products at a temperature between about room temperature and 50° C. for up to about 2 hours with a suitable solvent such as anhydrous methylene chloride to sufficiently reduce the viscosity for filtration, and then the mixture can be filtered under pressure and the filtrate preferably treated with a filtering aid and refiltered. The product can then be recovered by removal of the solvent.

The following examples will serve to illustrate the invention and the preferred embodiments thereof. All percentages in said examples and elsewhere in the specification are by weight unless otherwise indicated.

EXAMPLE I

Diethylene glycol (7.0 grams, 0.066 mole), ethylene carbonate (176 grams, 2.0 moles) and catalyst (0.00073 mole) were charged to a 3-necked, 500 milliliter round-bottomed flask fitted with a thermometer, motor driven Tru-Bore paddle stirrer and a bulb-type condenser cooled to 15° C. The reaction was indicated by the evolution of carbon dioxide bubbles in a mineral oil bubbler. The reaction was conducted under atmospheric pressure at 195° C. using a heating mantle. After the reaction was complete, the crude product mixture was transferred to a 200-cubic centimeter distillation flask equipped with a Claisen head and distilled at 195° C. and 3 millimeters of mercury pressure under a stream of nitrogen to remove the high boiling unreacted ethylene carbonate and other volatiles from the viscous product. The products were recovered, analyzed, and are reported in the following Table 1 with the reaction times and catalysts employed:

TABLE 1.—THE CATION EFFECT IN THE FORMATION OF POLYGLYCOL CARBONATES FROM ETHYLENE CARBONATE AND DIETHYLENE GLYCOL AT 195° C. AND 1 ATMOSPHERE

| Catalyst [1] | Time (hours) | $CO_2$ loss (grams) [2] | Volatiles (grams) [3] | Product (grams) | Polymer character | |
|---|---|---|---|---|---|---|
| | | | | | Percent $CO_2$ | Molecular weight |
| $Li_2CO_3$ | 3.0 | 29.6 | 114.4 | 39.0 | 17.6 | 1,635 |
| $Na_2CO_3$ | 2.5 | 73.6 | 16.7 | 92.7 | 13.4 | 1,230 |
| $K_2CO_3$ | 2.0 | 81.0 | 0.0 | 102.0 | 11.6 | 1,380 |
| $Na_2SnO_3 \cdot 3H_2O$ | 2.0 | 63.0 | 6.0 | 114.0 | 20.6 | 1,330 |
| $K_2SnO_3 \cdot 3H_2O$ | 1.25 | 61.6 | 15.0 | 106.9 | 20.5 | 1,650 |

[1] The catalyst level was 0.00073 moles for 2.0 moles, 176 grams of ethlene carbonate. When lithium salts were used, the catalyst level was raised to 0.00146 moles per 2.0 moles ethylene carbonate.
[2] The weight loss during the reaction was assumed to be only $CO_2$.
[3] The volatiles topped from the crude product were mainly ethylene carbonate, but some low boiling glycols were present.

From the results, it can be seen that with the use of the potassium and sodium stannate catalysts of the invention, more product is produced in less time having a high carbon dioxide content.

EXAMPLE II

The procedure of Example I was repeated employing various sodium salts as the catalyst and the results are reported in the following Table 2:

TABLE 2.—THE EFFECT OF SODIUM SALTS ON THE POLYMERIZATION OF ETHYLENE CARBONATE AT 195° C. AND 1 ATMOSPHERE

| Catalyst (0.00073 mole) | Time (hours) | $CO_2$ loss (grams) [1] | Volatiles (grams) [2] | Product (grams) | Polymer character | |
|---|---|---|---|---|---|---|
| | | | | | Percent $CO_2$ | Molecular weight |
| $Na_2CO_3$ | 2.5 | 73.6 | 16.7 | 92.7 | 13.4 | 1,203 |
| $NaBO_2$ | 2.0 | 66.4 | 22.8 | 93.8 | 16.6 | 1,270 |
| $NaBO_3$ | 3.0 | 53.7 | 46.2 | 83.1 | 16.5 | 1,420 |
| $NaBF_4$ | 2.0 | 68.4 | 33.7 | 81.0 | 13.5 | 1,250 |
| $Na_2O \cdot Al_2O_3 \cdot 3H_2O$ | 3.0 | 72.8 | 19.3 | 90.9 | 12.5 | 1,250 |
| $Na_4P_2O_7 \cdot 10H_2O$ | 3.0 | 65.6 | 36.8 | 77.6 | 13.6 | 1,165 |
| $Na_6P_4O_{13}$ | 3.0 | 34.8 | 118.0 | 30.2 | 17.0 | 1,050 |
| $Na_2SnO_3 \cdot 3H_2O$ | 2.0 | 63.0 | 6.0 | 114.0 | 20.6 | 1,330 |
| $Na_2SiO_3 \cdot 9H_2O$ | 1.5 | 67.0 | 14.7 | 101.3 | 12.9 | 1,120 |

[1] It was assumed that the total loss in weight was due to $CO_2$ loss.
[2] The volatiles topped from the crude product were mainly ethylene carbonate, but some low boiling glycols were present.
[3] The reaction was sluggish and was carried out at 215° C.

From the data reported therein, it can be seen that the sodium stannate catalyst is more effective in producing more product and/or a higher carbon dioxide percent in the same or less reaction time.

EXAMPLE III

In accordance with the procedure of Example I, a number of potassium salts were employed as catalysts and the results are reported in the following Table 3:

TABLE 3.—THE EFFECT OF POTASSIUM SALTS ON THE POLYMERIZATION OF ETHYLENE CARBONATE AT 195° C. AND 1 ATMOSPHERE

| Catalyst (0.00073 mole) | Time (hours) | $CO_2$ loss (grams)[1] | Volatiles (grams)[2] | Product (grams) | Polymer character | |
|---|---|---|---|---|---|---|
| | | | | | Percent $CO_2$ | Molecular weight |
| $K_2CO_3$ | 2.0 | 81.0 | 0.0 | 102.2 | 11.6 | 1,380 |
| KF | 2.0 | 81.2 | 0.0 | 101.8 | 11.8 | 1,140 |
| $K_2SnO_3 \cdot H_2O$ | 1.25 | 61.1 | 15.0 | 106.9 | 20.5 | 1,470 |
| $K_5P_3O_{10}$ | 3.0 | 77.8 | 12.1 | 93.1 | 12.8 | 1,120 |
| $K_2ZnO_2$ | 2.0 | 78.0 | 2.0 | 103.0 | 12.0 | 1,120 |
| $K_4P_2O_7$ | 2.0 | 63.9 | 33.1 | 86.0 | 14.4 | 1,455 |
| $KAlO_2 \cdot 1.5H_2O$ | 3.0 | 76.5 | 5.0 | 101.5 | 13.0 | 1,200 |
| $K[Al(OCH_3)_4]$ | 3.0 | 61.3 | 35.1 | 86.6 | 14.2 | 1,455 |
| $K_2SnO_3 \cdot 3H_2O$ | 1.5 | 59.0 | 8.1 | 115.9 | 21.1 | 1,515 |

[1,2] See footnotes 1 and 2 bottom of Table 2.

From the table it can be seen that the mono and trihydrate stannate catalysts of the invention are effective in producing more product and/or a higher carbon dioxide percent in the same or less reaction time.

EXAMPLE IV

In accordance with the procedure of Example I, various binary catalyst systems were employed and the results are reported in the following Table 4:

in a short reaction period. The results also indicate, however, that the employment of other catalysts in addition to the catalysts of the invention have little or no effect. Although the binary catalyst system of stannic acid and sodium silicate was no more effective than sodium stannate employed by itself (the sodium silicate effect is shown in Table 2), the catalyst formed was completely soluble in the reaction medium whereas sodium stannate or sodium silicate when used alone are insoluble.

EXAMPLE V

In accordance with the general procedure of Example

TABLE 4.—THE EFFECT OF BINARY CATALYST SYSTEMS ON THE POLYMERIZATION OF ETHYLENE CARBONATE AT 195° C. AND 1 ATMOSPHERE

| Catalyst[1] | Time (hour) | $CO_2$ loss (grams)[2] | Volatiles (grams)[3] | Product (grams) | Polymer character | |
|---|---|---|---|---|---|---|
| | | | | | Percent $CO_2$ | Molecular weight |
| $K_2CO_3/SnO_2$ | 1.5 | 71.3 | 14.0 | 98.5 | 14.2 | 1,446 |
| $K_2SnO_3/SnO_2$ | 1.25 | 59.7 | 5.5 | 118.2 | 19.1, 20.9 | 1,540 |
| $Na_2SnO_3/SnO_2$ | 2.0 | 63.5 | 8.4 | 112.1 | 20.0 | 1,440 |
| $K_2CO_3$/Zn borate | 2.0 | 80.8 | 0.0 | 102.2 | 11.9 | 1,370 |
| $K_2SnO_3/Et_3NBr$ | 2.0 | 70.5 | 12.2 | 100.3 | 18.8 | 1,265 |
| $Na_2SiO_3/H_2SnO_3$ | 1.5 | 55.9 | 20.1 | 107.0 | 20.0 | 1,465 |
| $Ba(OH)_2/H_2SnO_3$[4] | 2.5 | 71.0 | 13.4 | 98.6 | 15.0 | 1,275 |
| $Na_2SnO_3/H_2SnO_3$ | 1.5 | 56.9 | 16.1 | 110.0 | 19.3 | 1,368 |
| $Na_2SnO_3/AlCl_3$ | 1.25 | 54.5 | 35.3 | 93.2 | 19.3 | 1,418 |
| BaO/Zn borate[5] | 3.0 | 38.0 | 102.0 | 43.0 | 18.2 | 1,240 |

[1] The alkali metal salts, $Ba(OH)_2$, Zn borate and $Et_3NBr$ levels were 0.00073 moles; the other components were 0.00146 moles unless otherwise stated.
[2] The weight loss during the reaction was assumed to be due to $CO_2$ loss only.
[3] The toppings from the crude product contained ethylene carbonate and some low boiling glycols.
[4] The temperature of reaction was 195°–215° C. All other reactions were carried out at 195° C.
[5] This catalyst system was that used by J. D. Malkemus; U.S. Pat. 3,133,113. The catalyst level was 0.05 gram of each component.

From the reported results, it can be seen that the catalysts of the invention can be employed with other catalysts. Further, the catalysts of the invention can be formed I, polycarbonates were prepared in a rocking autoclave at elevated pressures and the results are reported in the following Table 5:

TABLE 5.—THE EFFECT OF PRESSURE ON THE POLYMERIZATION OF ETHYLENE CARBONATE

| Reactants | | | | Pressure, p.s.i.g. | | | | | | | Polymer | | |
|---|---|---|---|---|---|---|---|---|---|---|---|---|---|
| E.C. grams | D.E.G. (grams) | Ratio (mole) | Catalyst (mole) | Initial | Final | Time (hours) | Temperature (° C.) | $CO_2$ loss (grams) | Recovered E.C. (grams) | Product (grams) | Percent $CO_2$ | Molecular weight | Remarks |
| 176 | 7.0 | 1:0.033 | $K_2SnO_3 \cdot 3 H_2O$ (0.00073) | [1]1 | [1]1 | 1.25 | 195 | 61.1 | 15.0 | 106.9 | 20.5 | 1,400 | 1 |
| 132.7 | 5.3 | 1:0.033 | $K_2SnO_3 \cdot 3 H_2O$ (0.00073) | 140 | 390 | 5.5 | 195 | <3.8 | 119.8 | 14.4 | 26.1 | 1,938 | 2, 3 |
| 111.6 | 4.4 | 1:0.033 | $K_2SnO_3 \cdot 3 H_2O$ (0.0073) | 50 | 50 | 5.0 | 195–100 | <13.0 | 78.8 | 24.2 | 22.4 | 1,720 | 2, 4 |
| 88.6 | 3.5 | 1:0.033 | $Na_3PO_4 \cdot 12 H_2O$ (.00024) | [1]1 | 725 | 24.0 | 200 | 14.0 | 56.6 | 21.5 | 16.5 | 1,160 | 2 |
| 88.6 | 3.5 | 1:0.033 | $K_2CO_3$ (0.0005) | [1]1 | 1,350 | 24.0 | 200 | 28.5 | 20.4 | 43.1 | 13.8 | 1,280 | 2 |

[1] Atmosphere.

REMARKS:
1. The reaction was carried out at atmospheric pressure using a glass vessel fitted with stirrer; 2. The reaction was carried out in a rocking autoclave; 3. The autoclave was purged with $CO_2$ then pressured to 140 p.s.i.g. before heating; 4. The autoclave was purged with $CO_2$ then pressurized to 50 p.s.i.g. The pressure was held at 50 p.s.i.g. by manually bleeding the system.

in situ. Thus, the employment of a binary catalyst comprising sodium silicate and stannic acid results in the formation of sodium stannate and a polycarbonate formed in good yield with a high percentage of carbon dioxide

EXAMPLE VI

In accordance with the procedure of Example I, Examples were conducted in which the ratio of the initiator and catalyst were varied so as to vary the molecular weight of the polymer. The results are reported in the following Table 6:

TABLE 6.—THE EFFECT OF INITIATOR CONCENTRATION ON THE MOLECULAR WEIGHT

| Catalyst | Ethylene carbonate/ diethylene glycol ratio | Polymer character | |
|---|---|---|---|
| | | Percent $CO_2$ | Molecular weight |
| $K_2SnO_3$ | 30 | 21.0 | 1,650, 1,515 |
| $K_2SnO_3$ | 40 | 22.0 | 1,790 |
| $K_2SnO_3$ | 50 | 22.0 | 1,990 |
| $K_2CO_3$ | 30 | 12.0 | 1,380 |
| $K_2CO_3$ | 71 | 13.0 | 2,267 |

From the table, it can be seen that polymers of many variable molecular weights can be prepared.

The following example illustrates the use of a trifunctional initiator.

EXAMPLE VII

Ethylene carbonate (9.0 moles, 792 grams) and trimethylolpropane (0.67 mole, 90 grams) were allowed to react in the presence of potassium stannate (0.00165 mole, 0.493 gram) at atmospheric pressure for 2.5 hours at 193° C. The temperature was then reduced to 150° C. and 0.23 cubic centimeter of 85.6 percent phosphoric acid were added to precipitate the catalyst. The mixture was agitated at 150° C. for 0.5 hour and then 7 grams of Micro-Cel "C" were added and agitation continued for an additional ½ hour. The crude product was then slowly allowed to cool to room temperature and 400 cubic centimeters of anhydrous methylene chloride (dried over calcium hydride) were added to reduce the viscosity of the product. After filtering, the filtrate containing methylene chloride, was distilled to a pot temperature of 165° C. at atmospheric pressure and the high boiling glycols and unreacted ethylene carbonate were removed by distilling at 185° C. under 2 millimeters of mercury pressure. The product recovered weighed 491 grams and the analysis was as follows:

Potassium 1 p.p.m.
Tin—1 p.p.m.
$CO_2$—18.9%
Hydroxyl number—163.4 (mol. wt.=1010)
pH—6.9
Viscosity (Brookfield) 25° C.—2365 cps.

In accordance with the same general procedure of the previous example, other polyfunctional initiators were employed and the reaction conditions, type, and concentration of initiator catalyst and analysis are shown in the following Table 7:

TABLE 7.—SUMMARY OF PREPARATIONS

| Ex. | Reaction conditions | | Reactor charge | | | Catalyst | | Analysis | | | Remarks |
|---|---|---|---|---|---|---|---|---|---|---|---|
| | Temperature (° C.) | Time (hours) | E.C.[1] (moles) | Initiator Type | Moles | Type | Concentration ($\times 10^4$)[8] | OH number | Molecular weight | Percent $CO_2$ | |
| 1 | 193 | 2.5 | 9.0 | TMP[2] | 0.67 | $K_2SnO_3 \cdot 3H_2O$ | 1.83 | 163 | 1,010 | 18.9 | [9] |
| 2 | 195 | 1.75 | 9.0 | TMP | 0.12 | $K_2SnO_3 \cdot 3H_2O$ | 3.66 | 49 | 3,430 | 21.5 | [9] |
| 3 | 195 | 3.0 | 9.0 | GLY[3] | 0.12 | $K_2SnO_3 \cdot 3H_2O$ | 3.66 | 46 | 3,680 | 23.4 | [9] |
| 4 | 195 | 1.75 | 9.0 | TMP | 0.12 | $K_2CO_3$ | 3.22 | 60 | 2,810 | 13.8 | [9] |
| 5 | 195 | 1.0 | 2.0 | PE[4] | 0.154 | $K_2SnO_3 \cdot 3H_2O$ | 3.65 | 256 | 878 | 16.5 | [10] |
| 6 | 160–195 | 2.75 | 2.0 | PE | 0.154 | $K_2SnO_3 \cdot 3H_2O$ | 3.65 | | | | [10 11] |
| 7 | 195 | 1.24 | 2.0 | SB[5] | 0.222 | $K_2SnO_3 \cdot 3H_2O$ | 1.82 | 418 | 804 | 7.4 | [12] |
| 8a | 195 | 0.55 | 8.4 | SU[6] | 0.035 | $K_2SnO_3 \cdot 3H_2O$ | 3.46 | | | | [13] |
| 8b | 188–190 | 0.3 | 2.0 | SU / DEG[7] | 0.035 / 0.035 | $K_2SnO_3 \cdot 3H_2O$ | 7.3 | | | | [13] |
| 8c | 195 | 1.0 | 2.0 | SU / DEG | 0.035 / 0.20 | $K_2SnO_3 \cdot 3H_2O$ | 7.3 | 269 | | 16.3 | |
| 8d | 180–185 | 4.0 | 2.0 | SU / $H_2O$ | 0.10 / 0.20 | $K_2SnO_3 \cdot 3H_2O$ | 3.66 | 386 | | 7.7 | |
| 8e | 170–180 | 9.0 | 2.0 | SU | 0.40 | $K_2SnO_3 \cdot 3H_2O$ | 7.3 | 325 | | 2.2 | |
| 8f | 175 | 0.5 | 2.0 | SU | 0.125 | $K_2SnO_3 \cdot 3H_2O$ | 3.66 | | | | [14 15] |

[1] Ethylene carbonate. [2] Trimethylolpropane. [3] Glycerine. [4] Pentaerythritol. [5] Sorbitol. [6] Sucrose. [7] Diethylene glycol. [8] Catalyst concentration is given in moles of catalyst per mole of ethylene carbonate. [9] Trifunctional polyglycol carbonate. [10] Tetrafunctional polyglycol carbonate. [11] The product went to gel on topping at 185° C. [12] The crude product contained 43% by weight of lower glycols. [13] Gel formed during the reaction. [14] The catalyst promoted decomposition of the solvent, dimethylacetamide (DMAC). [15] 80 cc. of DMAC was used as the solvent medium.

From the table, it can be seen that the tri- and tetrafunctional initiators are most efficient in producing polycarbonates of high carbon dioxide concentration and good yield with the trifunctional initiators being especially preferred.

EXAMPLE VIII

Diethylene glycol (7.0 grams, 0.066 mole), ethylene carbonate (176 grams, 2.0 mole) and catalyst (0.00073 mole) were charged to a 3-necked, 500-milliliter round-bottomed flask equipped with thermometer, a motor driven Tru-Bore paddle stirrer and a bulb-type condenser. The temperature was then raised to 215° C. and maintained at that temperature using a Thermo-O-Watch electronic controller. After a three hour reaction period, the crude product was pressure filtered to remove the insoluble catalyst and topped in a rotary evaporator at 185° C. per 1 milliliter.

From the results reported in the following Table 8, it can be seen that the barium stannate catalyst is more effective than magnesium stannate.

TABLE 8.—THE CATALYTIC EFFECT OF DIVALENT METAL STANNATES FOR THE PREPARATION OF GLYCOL POLYCARBONATES

| Catalyst[1] | Reaction temperature (° C.) | Time (hours) | Weight loss (grams)[2] | Volatiles recovered (grams)[3] | Product weight (grams) | Polymer character | |
|---|---|---|---|---|---|---|---|
| | | | | | | Percent $CO_2$ | Molecular weight |
| $BaSnO_3 \cdot 3H_2O$ | 215 | 3.0 | 60.0 | 64.8 | 58.5 | 19.6 | 1,233 |
| $MgSnO_3 \cdot 3H_2O$ | 215 | 3.0 | 56.0 | 89.4 | 37.6 | 14.6 | 763 |

[1] The catalyst concentration was 0.00073 mole per 2.0 moles of ethylene carbonate.
[2] The weight loss during the reaction is assumed to be mainly $CO_2$, but cobalt stannate shows a weight loss greater than the actual amount of $CO_2$ contained in the reactants.
[3] The volatiles topped from the crude product were mainly ethylene carbonate, but ethylene glycol and diethylene glycol were present.

The following example illustrates the preparation of an unsaturated polycarbonate.

EXAMPLE IX

Lithium aluminum hydride (LAH) (3.0 moles, 113.8 grams) and anhydrous ethyl ether (4 pounds) were added to a 3-necked, 5-liter flask equipped with a stirrer, water cooled condenser, nitrogen inlet tube and a 1-liter addition funnel. To this solution was slowly added a mixture of diethyl allyl-malonate (2.0 moles, 400.4 grams) and ethyl ether (1 pound) over a 2½ hour period while the pot temperature was maintained at 35° C. The mixture was maintained at this temperature and agitated for 3 days. Excess LAH was then destroyed using ethyl acetate (1.5 mole in 250 centimeters ethyl ether). The product was hydrolyzed using 400 cubic centimeters of saturated aqueous sodium chloride followed by 600 cubic centimeters of water. The mixture was filtered, the filtrate distilled at atmospheric pressure to remove the ether and then the product was distilled under reduced pressure (5 millimeters of mercury). The fraction boiled at 104 to 105° C. per 5 millimeters of mercury, 99.5 grams were collected. Two additional reductions were made with lithium aluminum hydride to produce 385 grams of crude material and the combined preparations were then twice refractionated using a 45 plate spinning band column. After the second pass through the column, the yield was 269 grams. Infra-red analysis showed that the product was virtually free of esters and gas chromatographic analysis confirmed the purity of the product at better than 99 percent. This product is 2-allyl-1,3-propane diol, and was reacted with 30 moles of ethylene carbonate at a temperature between 185 and 195° C. for 1 hour using potassium stannate catalyst at a concentration of $1.87 \times 10^{-4}$ moles per mole of ethylene carbonate.

Although the present invention has been described with reference to the specific details of particular embodiments thereof, it is not intended thereby to limit the scope of the invention except insofar as the specific details are recited in the appended claims.

I claim:

1. In a process for the preparation of polycarbonates by the polymerization of: an alkylene or dialkyl carbonate, or 1,2-epoxide with carbon dioxide, and a polyol the improvement which comprises adding a minor but effective amount of a stannate catalyst of the formula:

$$M_xSnO_3$$

wherein M is an alkali metal, alkaline earth metal or ammonium; and $x$ is an integer of 1 or 2.

2. The process of claim 1 wherein the reaction is conducted at atmospheric pressure.

3. The process of claim 1 wherein the catalyst is formed in situ.

4. The process of claim 3 wherein the catalyst is prepared from sodium silicate and stannic acid.

5. The process of claim 1 wherein M is an alkali metal.

6. The process of claim 1 wherein M is potassium.

7. The process of claim 1 wherein M is sodium.

8. The process of claim 1 wherein the polycarbonate is prepared by polymerizing an alkylene carbonate in the presence of a polyol initiator.

9. The process of claim 1 wherein the catalyst is a trihydrate.

10. The process of claim 1 wherein the catalyst is selected from $Na_2SnO_3 \cdot 3H_2O$ and $K_2SnO_3 \cdot 3H_2O$.

References Cited

UNITED STATES PATENTS 3,313,782  4/1967  Springmann et al. ____ 260—77.5

SAMUEL H. BLECH, Primary Examiner

U.S. Cl. X.R.

260—2.5 AM, 47 XA, 77.5 AT, 463